(12) United States Patent
Yang et al.

(10) Patent No.: US 11,866,064 B2
(45) Date of Patent: Jan. 9, 2024

(54) METHOD AND APPARATUS FOR PROCESSING MAP DATA

(71) Applicant: Beijing Baidu Netcom Science Technology Co., Ltd., Beijing (CN)

(72) Inventors: Yang Yang, Beijing (CN); Jianxu Zhang, Beijing (CN); Wenlong Chen, Beijing (CN); Pengbin Yang, Beijing (CN); Fengze Han, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 214 days.

(21) Appl. No.: 17/498,073

(22) Filed: Oct. 11, 2021

(65) Prior Publication Data
US 2022/0024482 A1    Jan. 27, 2022

(30) Foreign Application Priority Data
Jan. 25, 2021    (CN) .......................... 202110096417.2

(51) Int. Cl.
*B60W 60/00* (2020.01)
*G06T 7/73* (2017.01)
(Continued)

(52) U.S. Cl.
CPC .......... *B60W 60/001* (2020.02); *G01C 21/30* (2013.01); *G01S 13/867* (2013.01); *G06T 7/74* (2017.01);
(Continued)

(58) Field of Classification Search
None
See application file for complete search history.

(56) References Cited

U.S. PATENT DOCUMENTS

| 2013/0278601 | A1 | 10/2013 | Chen et al. |
| 2014/0379254 | A1* | 12/2014 | Miksa ................... G01C 21/30 |
| | | | 701/450 |

(Continued)

FOREIGN PATENT DOCUMENTS

| CN | 101794316 A | 8/2010 |
| CN | 102254431 A | 11/2011 |

(Continued)

OTHER PUBLICATIONS

Machine translation of CN-107478214-A (Year: 2017).*

(Continued)

*Primary Examiner* — Anne Marie Antonucci
*Assistant Examiner* — Kyle S Park
(74) *Attorney, Agent, or Firm* — Tucker Ellis LLP

(57) ABSTRACT

The present application discloses a method and an apparatus for processing map data, which relate to autonomous driving technologies in the field of data processing. The specific implementation is that: a controlling unit inputs initial positioning data collected by a data collecting unit to a data fusing unit to obtain fused positioning data, where the initial positioning data and the fused positioning data are data in a first coordinate system; the controlling unit obtains target positioning data according to the fused positioning data, where the target positioning data is data in a second coordinate system, and the second coordinate system is a coordinate system obtained by offsetting the first coordinate system; and the controlling unit performs a positioning operation on the target positioning data through at least one positioning unit, to determine a position of a vehicle corresponding to an autonomous driving system.

5 Claims, 4 Drawing Sheets

A controlling unit inputs initial positioning data collected by a data collecting unit to a data fusing unit to obtain fused positioning data, where the initial positioning data and the fused positioning data are data in a first coordinate system — S201

The controlling unit obtains target positioning data according to the fused positioning data, where the target positioning data is data in a second coordinate system, and the second coordinate system is a coordinate system obtained by offsetting the first coordinate system — S202

The controlling unit performs a positioning operation on the target positioning data through at least one positioning unit, to determine a position of a vehicle corresponding to an autonomous driving system — S203

(51) Int. Cl.
*G01C 21/30* (2006.01)
*G01S 13/86* (2006.01)

(52) U.S. Cl.
CPC ..... *B60W 2420/42* (2013.01); *B60W 2420/52* (2013.01); *G06T 2207/10044* (2013.01); *G06T 2207/30241* (2013.01); *G06T 2207/30252* (2013.01)

(56) References Cited

U.S. PATENT DOCUMENTS

| | | | | |
|---|---|---|---|---|
| 2017/0052032 | A1* | 2/2017 | Miksa | .................... G01C 21/30 |
| 2020/0200920 | A1 | 1/2020 | Irish et al. | |
| 2020/0175720 | A1 | 6/2020 | Hsu et al. | |
| 2020/0363218 | A1* | 11/2020 | Kim | .................... G01C 21/32 |
| 2021/0229280 | A1* | 7/2021 | Liu | .................... B25J 9/1664 |
| 2021/0263160 | A1* | 8/2021 | Zhang | .................... G01S 5/0009 |

FOREIGN PATENT DOCUMENTS

| | | | | |
|---|---|---|---|---|
| CN | 107478214 | A | * | 12/2017 |
| CN | 107977366 | A | | 5/2018 |
| CN | 108509974 | A | | 9/2018 |
| CN | 108845342 | A | | 11/2018 |
| CN | 109408041 | A | | 3/2019 |
| CN | 110806215 | A | | 2/2020 |
| CN | 110906923 | A | | 3/2020 |
| CN | 111024059 | A | | 4/2020 |
| CN | 111065043 | A | | 4/2020 |
| CN | 111238494 | A | | 6/2020 |
| CN | 111524185 | A | | 8/2020 |
| CN | 110243380 | B | | 11/2020 |
| CN | 110929703 | B | | 11/2020 |
| CN | 111881244 | A | | 11/2020 |
| CN | 112001456 | A | * | 11/2020 ......... G06K 9/00798 |
| JP | 2020-085886 | A | | 6/2020 |
| KR | 2019-0109645 | A | | 9/2019 |

OTHER PUBLICATIONS

Machine translation of CN-112001456-A (Year: 2020).*
Machine translation of CN-108845342-A (Year: 2018).*
Notice of Reasons for Refusal from corresponding Japanese Patent Application No. 2022-008509, dated Mar. 17, 2023, 9 pages.
Search Report for corresponding European application No. 21202232.1, dated Apr. 8, 2022, 13 pages.
Notice of Handling the Registration Formalities and Grant of Notice of Patent Right for Invention of corresponding Chinese Application No. 202110096417.2, dated Sep. 26, 2023, 17 pages.
Kang Lu et al., "Coordinate Conversion System Among Various Electronic Maps", Remote Sensing Information, vol. 33, No. 2, dated Apr. 2018, 6 pages.
Wu Xiao et al., "Research on Vehicle Monitoring Oriented Map Visualization in LBS", Geography and Geo-Information Science, vol. 32, No. 1, dated Jan. 2016, 6 pages.

* cited by examiner

METHOD AND APPARATUS FOR PROCESSING MAP DATA

CROSS-REFERENCE TO RELATED APPLICATION

The present application claims priority to Chinese Patent Application No. 202110096417.2 titled "METHOD and APPARATUS for PROCESSING MAP DATA" filed on Jan. 25, 2021, which is hereby incorporated by reference in its entirety.

TECHNICAL FIELD

The present application relates to autonomous driving technologies in the field of data processing, and in particular to a method and an apparatus for processing map data.

BACKGROUND

With the continuous development of technologies related to autonomous driving, it has become an industry consensus to locate vehicles based on multi-sensor fusion maps.

At present, all maps need to be encrypted before being used. The maps are in the World Geodetic System 1984 (WGS84) coordinate system before the encryption and are in the GCJ-02 (No. 02 Standard of the National Administration of Surveying and Mapping) coordinate system after the encryption. The encrypted map introduces non-linear random errors and a positioning process based on the GCJ-02 coordinate system will cause accumulated errors.

In addition, the generated accumulated error cannot be sensed or eliminated. Therefore, the current positioning implementation of the prior art suffers from the problem of low accuracy of positioning.

SUMMARY

The present application provides a method and an apparatus for processing map data.

According to a first aspect of the present application, a method for processing map data applied to an autonomous driving system is provided, the autonomous driving system including a controlling unit, a data collecting unit, a data fusing unit, and at least one positioning unit, and the method includes:

inputting, by the controlling unit, initial positioning data collected by the data collecting unit to the data fusing unit to obtain fused positioning data, where the initial positioning data and the fused positioning data are data in a first coordinate system;

obtaining, by the controlling unit, target positioning data according to the fused positioning data, where the target positioning data is data in a second coordinate system, and the second coordinate system is a coordinate system obtained by offsetting the first coordinate system; and performing, by the controlling unit, a positioning operation on the target positioning data through the at least one positioning unit, to determine a position of a vehicle corresponding to the autonomous driving system.

According to a second aspect of the present application, an apparatus for processing map data applied to an autonomous driving system is provided, the autonomous driving system including a controlling unit, a data collecting unit, a data fusing unit, and at least one positioning unit, and the apparatus includes:

an inputting module for the controlling unit to input initial positioning data collected by the data collecting unit to the data fusing unit to obtain fused positioning data, where the initial positioning data and the fused positioning data are data in a first coordinate system;

a processing module for the controlling unit to obtain target positioning data according to the fused positioning data, where the target positioning data is data in a second coordinate system, and the second coordinate system is a coordinate system obtained by offsetting the first coordinate system;

a determining module for the controlling unit to perform a positioning operation on the target positioning data through the at least one positioning unit, to determine a position of a vehicle corresponding to the autonomous driving system.

According to a third aspect of the present application, an electronic device is provided, including:

at least one processor; and a memory communicatively connected with the at least one processor; where, the memory stores instructions executable by the at least one processor, and the instructions are executed by the at least one processor, so that the at least one processor is enabled to execute the method according to the first aspect.

According to a fourth aspect of the present application, a non-transitory computer readable storage medium storing computer instructions is provided, where the computer instructions are configured to cause a computer to execute the method according to the first aspect.

According to a fifth aspect of the present application, a computer program product is provided, the computer program product including: a computer program stored in a readable storage medium, and at least one processor of an electronic device can read the computer program from the readable storage medium, and the at least one processor executes the computer program to cause the electronic device to execute the method according to the first aspect.

The technology according to the present application solves the problem of low accuracy of positioning.

It should be understood that the content described in this section is not intended to identify the key or important features of the embodiments of the present application, nor is it intended to limit the scope of the present application. Other features of the present application will be easily understood through the following description.

BRIEF DESCRIPTION OF DRAWINGS

The accompanying drawings are used for better understanding to the solution and do not constitute a limitation to the present application. In which.

DESCRIPTION OF EMBODIMENTS

Figure 1:
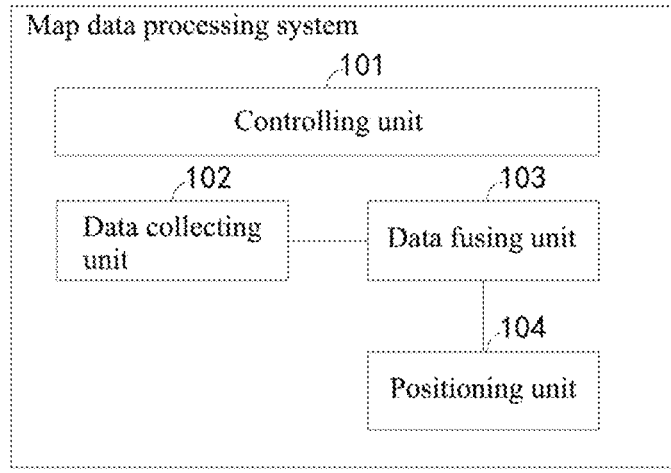
FIG. 1 is a schematic diagram of an implementation of a system for processing map data provided by an embodiment of the present application.

The exemplary embodiments of the present application are described below with reference to the accompanying drawings, which include various details of the embodiments of the present application to facilitate understanding, and should be regarded as merely exemplary. Accordingly, those of ordinary skill in the art should realize that various changes and modifications can be made to the embodiments described herein without departing from the scope and spirit of the present application. Similarly, descriptions of well-known functions and structures are omitted in the following description for clarity and conciseness.

In order to better understand the technical solutions of the present application, the background involved in the present application will be further introduced in detail below.

With the continuous development of technologies related to autonomous driving, positioning based on multi-sensor fusion maps has become an industry consensus during the realization of autonomous driving. Where the multi-sensor fusion maps can be high-precision maps and navigation maps, for example.

At present, all maps used need to be encrypted in the processing of realizing positioning based on high-precision maps or navigation maps in the prior art. Coordinates of the encrypted maps are in the GCJ-02 coordinate system, which forms a one-way mapping relationship with the unencrypted WGS84 coordinate system (WGS84 is one-way converted to GCJ-02) to achieve the purpose of encryption.

The encrypted map introduces a non-linear random error, which cannot be solved in the reverse direction. In the conversion of single point positioning, a combination of an offset map and offset coordinates can be used for the single point positioning while ensuring a high-precision correspondence.

However, in the mainstream positioning scheme using multi-sensor fusion high-precision maps, the offset coordinates will produce accumulated errors as distances from the reference point increases. The reference point can be understood as a coordinate zero point. In the actual implementation, the reference point may be a starting position of a vehicle, for example, or the reference point may also be selected as any position according to actual requirements, which is not limited in the embodiment.

It is worth noting that as the accumulated error is caused by being far away from the reference point, the reference point can be reset after a certain distance to alleviate the accumulated error.

However, such an implementation does not fundamentally eliminate the accumulated error, and it also requires constant interruption to continuous positioning, thus leading to a failure in the obtaining of continuous positioning data; in addition, the constant replacement of reference points will also cause the autonomous navigation system to be more vulnerable, hence increasing the risk of the system. Therefore, it is not feasible to reset the reference point after a certain distance to improve the accuracy of positioning.

However, the accumulated error generated by the offset coordinate cannot be sensed or eliminated online. Therefore, as the driving distance of the autonomous driving system keeps on increasing, the accumulated error will lead to huge errors (with reference to high-precision map matching information) of a movement perceivable by the Global Navigation Satellite System (GNSS), an inertial measurement unit (IMU), a speed of a vehicle, vision, a laser radar and the like. In the implementation, as the distance from the reference point increases, an accumulated error of about 1‰ is caused.

In summary, certain errors exist in the positioning based on the implementation of the prior art, which will lead to low accuracy of positioning.

It is also worth noting that the autonomous driving system includes a data fusing unit and a positioning unit. The data fusing unit is configured to fuse multiple pieces of positioning data collected, and the positioning unit then performs positioning based on the fusion result of the data fusing unit.

The collected positioning data is offset directly in the data fusing unit in the prior art, and the fusion is performed on the offset positioning data, after that the positioning unit performs positioning based on the offset fused positioning data. However, in the data fusing unit, the fused positioning data includes an accumulated error caused by the offsetting. If the positioning unit performs positioning based on the fusion result after the offsetting, the accumulated error will be transmitted between units, and the effect of the accumulated error cannot be eliminated.

Aiming at the problems in the prior art, the present application proposes the following technical solution: no offset processing is performed in the data fusing unit, and other modules perform offset processing based on a fusion result after the fusion processing of the collected positioning data is finished in the data fusing unit. It is ensured that the fused positioning data does not include the accumulated error caused by the offset processing, thereby effectively eliminating the generation and transmission of the accumulated error and improving the accuracy of positioning.

The method for processing map data provided by the present application will be introduced below in conjunction with specific embodiments. First, the system for processing map data provided by the present application will be described with reference to FIG. 1, which is a schematic diagram of an implementation of a system for processing map data provided by an embodiment of the present application.

As shown in FIG. 1, the system includes: a controlling unit 101, a data collecting unit 102, a data fusing unit 103, and at least one positioning unit 104.

Among them, the controlling unit 101 is configured to control operations of various units. For example, it can control the flow of data within the system, and can also control the various units to process data. The implementation of the specific control of the controlling unit 101 can be selected according to actual needs.

The data collecting unit 102 is configured to realize data collection. For example, the data collection can be performed by at least one sensor, which can be selected as one of the following sensors, for example:

GNSS sensors (GPS/RTK), IMU sensors, vehicle speed sensors (odometer), vision sensors, millimeter wave radar sensors, laser radar sensors, high-precision map sensors.

The GNSS sensors, such as Global Positioning System (GPS) sensors and Real-time kinematic (RTK) sensors, can provide accurate positions in the WGS-84 navigation coordinate system, with circular error probable (CEP) accuracy of 2-3 m, and are mainly configured to provide coarsegrained location constraints and to query high-precision maps to achieve the function of global navigation.

The IMU sensors, including accelerometers and gyroscope sensors, are configured to provide observations of linear acceleration and vehicle angular velocity in a vehicle body coordinate system, so as to achieve the function of motion prediction and dead-reckoning when the GNSS or vision sensors fail, as well as the function of motion prediction, to provide an accurate, low-latency global pose.

The vehicle speed sensors are currently equipped in most vehicles for providing real-time speeds in driving directions of vehicles. The speed can be used to provide speed constraints and improve dead-reckoning accuracy in the multi-sensor fusion.

Vision sensors are configured to provide a perception of lane line types, equations, and lane signs in the vehicle body coordinate system, and provide lane-level constraints in the multi-sensor fusion of lane-level positioning. By matching with high-precision maps, the vehicle can be positioned in the high-precision map, therefore, horizontal and vertical positioning functions with high-precision are achieved, meanwhile, lane lines with high-precision are outputted to a path planning and control module of the vehicle.

In the actual implementation, in addition to the sensors described above, a required sensor according to actual needs can also be selected to collect required data. The setting of the sensor and the specific data collected by the data collecting unit are not limited in the embodiment and can be varied according to actual needs.

The data fusing unit is configured to perform fusion based on at least one piece of data collected by the data collecting unit, so as to obtain positioning data after the processing of multi-sensor fusion.

The positioning unit in the embodiment is configured to provide positioning services according to the positioning data fused by the data fusing unit to realize positioning.

In a possible implementation, the system for processing map data introduced in FIG. 1 above can also be understood as an autonomous driving system. On the basis of the system introduced above, the following illustrates a specific implementation of a method for processing map data provided in the present application.

Figure 2:
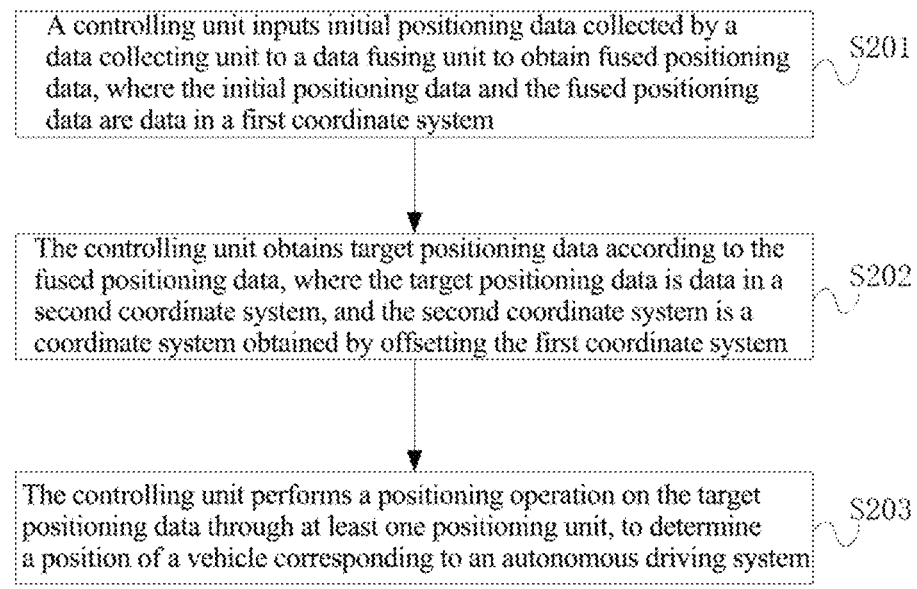
FIG. 2 is a flowchart of a method for processing map data provided by an embodiment of the present application.

FIG. 2 is a flowchart of a method for processing map data provided by an embodiment of the present application. As shown in FIG. 2, the method includes:

S201, the controlling unit inputs initial positioning data collected by the data collecting unit to the data fusing unit to obtain fused positioning data, where the initial positioning data and the fused positioning data are data in the first coordinate system.

In the embodiment, the data collecting unit may obtain the initial positioning data through collection. In a possible implementation, the initial positioning data may include multiple pieces of positioning data collected by at least one sensor. The specific sensors can be referred to the above description of the embodiments, and will not be repeated herein.

It is understandable that the initial positioning data is the data collected by the sensor without offset processing. Therefore, the initial positioning data in the embodiment is data in the first coordinate system, where the first coordinate system may be, for example, the WGS84 coordinate system.

In addition, the data fusing unit in the embodiment can perform fusion processing according to the initial positioning data collected by the multiple sensors in the data collecting unit to obtain the fused positioning data. The data fusion processing does not involve offset processing of the coordinates. Therefore, the fused positioning data is also data in the first coordinate system.

In the embodiment, the controlling unit is configured to realize a specific data flow and implementations of various units, so that the controlling unit in the embodiment can input the initial positioning data collected by the data collecting unit into the data fusing unit to obtain the fused positioning data.

S202, the controlling unit obtains target positioning data according to the fused positioning data, where the target positioning data is data in a second coordinate system, and the second coordinate system is a coordinate system obtained by offsetting the first coordinate system.

The fused positioning data, after being obtained, can be used as the basis for the other modules to enable the other modules to perform positioning operations. At the same time, due to requirements of relevant regulations, the data must undergo the offset processing during usage. Therefore, in the embodiment, the controlling unit can perform processing according to the fused positioning data to obtain the target positioning data.

Where the target positioning data is data in the second coordinate system. The second coordinate system can be, for example, the GCJ-02 coordinate system. The implementation of the offset processing can be realized, for example, by converting the WGS84 coordinate system to the GCJ-02 coordinate system. For the specific implementation of the processing, reference can be made to the implementation of the prior art, which is not limited in the embodiment.

S203, the controlling unit performs a positioning operation on the target positioning data through the at least one positioning unit, to determine a position of a vehicle corresponding to the autonomous driving system.

After obtaining the target positioning data, the controlling unit can perform the positioning operation on the target positioning data through the at least one positioning unit, so as to determine the position of the vehicle. During this process, it is ensured that the positioning is realized in the offset coordinate system.

It is understandable that the initial positioning data and the fused positioning data in the embodiment are in the first coordinate system, for example, the WGS84 coordinate system. There is no error in the data fusion processing as the offset processing is not performed, and the fused positioning data after the fusion processing is the basis for the other units, therefore, no accumulated error is generated or transferred.

Meanwhile, the controlling unit performs offset processing according to the fused positioning data to obtain the target positioning data, so that the positioning process is finished based on the offset coordinate system, thereby ensuring compliance with relevant regulations.

As discussed above, the data fusing unit in the embodiment calculates in the WGS84 coordinate system, and at least one positioning unit calculates in the GCJ-02 coordinate system, since the fused positioning data outputted from the data fusing unit is the basis for the operation of the positioning unit, the generation and accumulation of errors can be effectively avoided, and the offset processing to the coordinates is ensured. The accuracy of positioning can be effectively improved by eliminating the accumulated errors.

The method for processing map data provided by the embodiment of the present application includes: a controlling unit inputs initial positioning data collected by a data collecting unit to a data fusing unit to obtain fused positioning data, where the initial positioning data and the fused positioning data are data in a first coordinate system; the controlling unit obtains target positioning data according to the fused positioning data, where the target positioning data is data in a second coordinate system, and the second coordinate system is a coordinate system obtained by offsetting the first coordinate system; and the controlling unit performs a positioning operation on the target positioning data through at least one positioning unit, to determine a position of a vehicle corresponding to the autonomous driving system. By setting the fused positioning data to be calculated in the first coordinate system without offset, the generation and accumulation of errors can be effectively avoided. The target positioning data can be obtained based on the fused positioning data, thereby ensuring that the positioning operation is based on an offset map. In this way, the accuracy of positioning is effectively improved while ensuring compliance with regulations.

Figure 3:
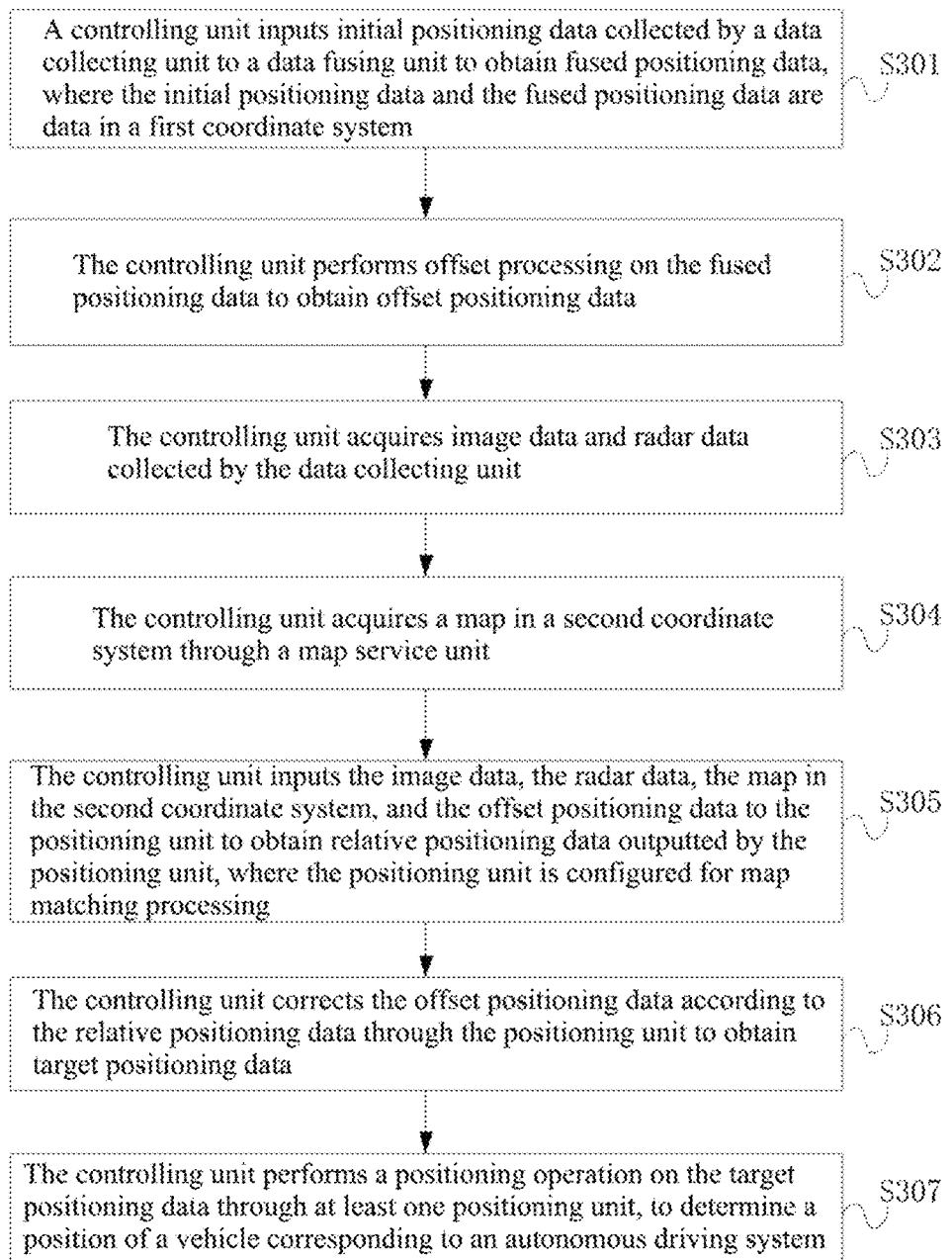
FIG. 3 is a second flowchart of a method for processing map data provided by an embodiment of the present application.
Figure 4:
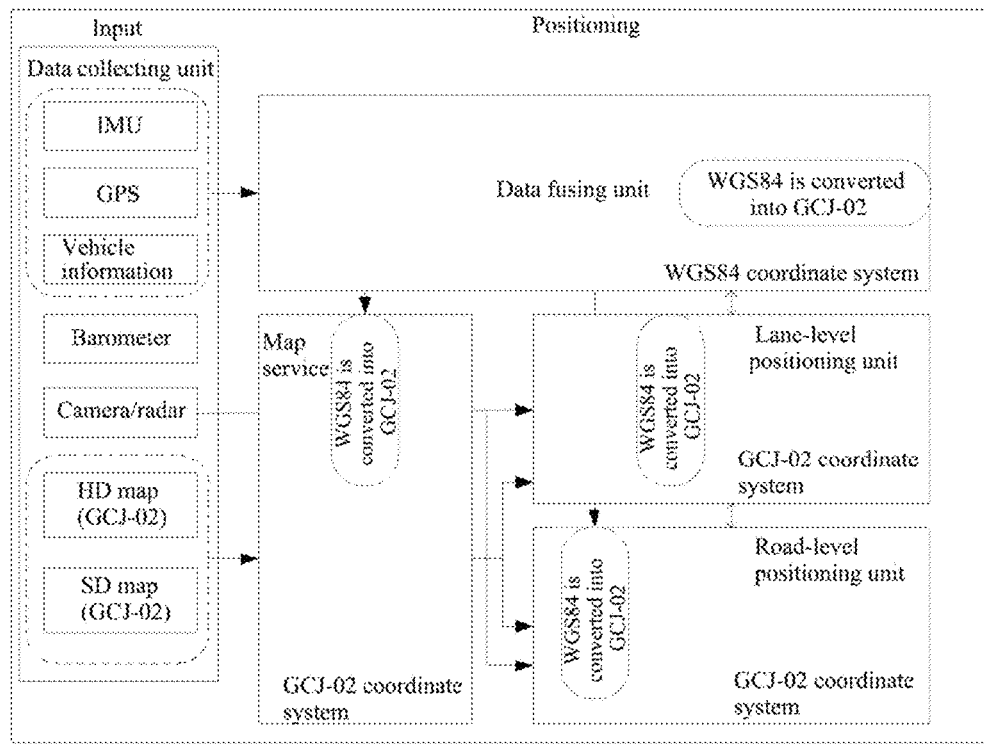
FIG. 4 is a schematic diagram of an implementation of a method for data processing provided by an embodiment of the present application.
Figure 5:
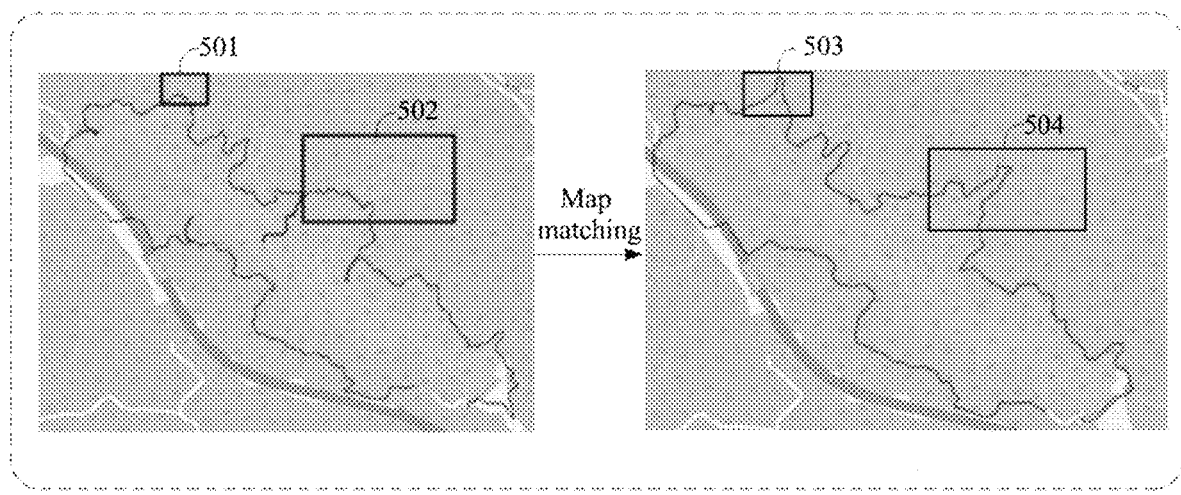
FIG. 5 is a schematic diagram of an implementation of map matching provided by an embodiment of the present application.

On the basis of the above embodiment, the method for processing map data provided by the embodiment of the present application will be further described in detail below in conjunction with FIGS. 3 to 5. FIG. 3 is a second flowchart of the method for processing map data provided by an embodiment of the present application. FIG. 4 is a schematic diagram of the implementation of the data processing method provided by an embodiment of the present application, and FIG. 5 is a schematic diagram of the implementation of map matching provided by an embodiment of the present application.

As shown in FIG. 3, the method includes:

S301, the controlling unit inputs initial positioning data collected by the data collecting unit to the data fusing unit to obtain fused positioning data, where the initial positioning data and the fused positioning data are data in a first coordinate system.

Where the implementation of S301 is similar to the implementation of S201, and further description will be made with reference to FIG. 4 the embodiment.

As shown in FIG. 4, the data collecting unit may include, for example, IMU, GPS, vehicle information, etc. The initial positioning data can be obtained through data collection by these subunits, and the initial positioning data collected by the data collecting unit has not been offset and is thus in the WGS48 coordinate system.

After that, the controlling unit can input the initial positioning data collected by the data collecting unit to the data fusing unit. It can be determined form FIG. 4 that the data fusing unit is in the WGS48 coordinate system, therefore, the data fusing unit in the embodiment receives the initial positioning data which is in the WGS48 coordinate system, and performs fusion processing according to the initial positioning data to obtain the fused positioning data in the WGS48 coordinate system.

Therefore, the data fusing unit in the embodiment calculates in the WGS48 coordinate system. As kinematics calculation of the vehicle is related to a physical model of the real world, and the WGS48 coordinate system is a coordinate system of the real world, the calculation in the WGS48 coordinate system can effectively ensure that there is no error in the obtained fused positioning data.

S302, the controlling unit performs offset processing on the fused positioning data to obtain offset positioning data.

The fused positioning data processed by the data fusing unit is the basis for the operation of the other units. According to relevant requirements, in the process of positioning implementation, the data and map must be offset processed.

Therefore, the controlling unit in the embodiment can perform offset processing on the currently determined fused positioning data to obtain the offset positioning data.

The implementation of the offset processing means that the positioning data is converted from the WGS48 coordinate system to the GCJ-02 coordinate system. The specific implementation can be any conversion method in the prior art, which is not limited in the embodiment. The offset positioning data after the processing is in the GCJ-02 coordinate system.

Referring to FIG. 4, it can be determined that, before the fused positioning data of the data fusing unit is inputted to the other units, the offset processing is needed to convert the data from the WGS48 coordinate system to the GCJ-02 coordinate system.

S303, the controlling unit acquires image data and radar data collected by the data collecting unit.

In the embodiment, the initial positioning data described above is data obtained from collection, the fused positioning data and the offset positioning data are data obtained from processing based on the initial positioning data. In order to ensure the accuracy of positioning, map matching is also required.

Take GPS as an example, map matching (Map-Matching) is a process of associating a sequence of GPS positions of operating vehicles to a road network of an electronic map, and converting a sampled sequence in the GPS coordinate into a coordinate sequence in the road network. As location information of a latitude and a longitude given by the GPS contains errors when being mapped to the road network of the electronic map, a trajectory of a vehicle may not fall on the road network without the map matching processing. In addition, due to a large time interval of GPS sampling, a distance of a connection of a GPS point pair will be less than an actual distance traveled by the vehicle.

Map matching can be understood in conjunction with FIG. 5. As shown in FIG. 5, assuming that location data before the map matching processing includes trajectories shown as 501 and 502, it can be seen that the trajectories shown as 501 and 502 are not matching with the actual road network very well and there exist certain errors.

After the map matching, the trajectory shown as 501 is corrected into a trajectory shown as 503, and the trajectory shown as 502 is corrected into a trajectory 504, respectively, hence effective matching with the actual road network is realized, thereby ensuring the accuracy of the positioning data.

In the map matching process, relevant environmental information of the real world can be determined according to the image data and the radar data collected by the data collecting unit, therefore, the controlling unit can acquire the image data and the radar data collected by the data collecting unit.

S304, the controlling unit acquires a map in the second coordinate system through a map service unit.

In the process of map matching, it is necessary to perform the matching based on a map. Therefore, the controlling unit also needs to acquire the map. In a possible implementation, the controlling unit can acquire the map through the map service unit.

It is understandable that map matching uses the offset location data and the offset map for matching and association. Therefore, the map acquired in the embodiment is a map in the GCJ-02 coordinate system. For example, referring to FIG. 4, the map acquired by the map service unit may be, for example, a high definition map (HD map), or may also be a standard definition map (SD map), both in the GCJ-02 coordinate system.

S305, the controlling unit inputs the image data, the radar data, the map in the second coordinate system, and the offset positioning data to the positioning unit to obtain relative positioning data outputted by the positioning unit, where the positioning unit is configured for map matching processing.

After acquiring the image data, the radar data, and the map in the second coordinate system, the map matching can be performed based on said data and the offset positioning data.

In a possible implementation, the controlling unit can input the image data, the radar data, the map in the GCJ-02 coordinate system, and the offset positioning data to the positioning unit, where the positioning unit may be, for example, a lane-level positioning unit or a road-level positioning unit as shown in FIG. 4, which is not limited in the embodiment.

Afterwards, the positioning unit performs map matching processing based on the above data to obtain the relative positioning data. For the specific implementation of the map matching processing, reference can be made to any possible implementation in the prior art, which is not limited in the embodiment.

S306, the controlling unit corrects the offset positioning data according to the relative positioning data through the positioning unit to obtain target positioning data.

The controlling unit may further correct the offset positioning data according to the relative positioning data through the positioning unit to obtain the target positioning data. Take the lane-level positioning unit as an example, for example, the lane-level positioning unit may add the relative positioning information after the map matching to the offset positioning data, so as to obtain the final target positioning data.

Where the target positioning data is data in the second coordinate system, and the second coordinate system is a coordinate system obtained by offsetting the first coordinate system.

S307, the controlling unit performs a positioning operation on the target positioning data through at least one positioning unit, to determine a position of a vehicle corresponding to the autonomous driving system.

Where the implementation of S307 is similar to the implementation of S203, and will not be repeated herein.

In the embodiment of the present application, only the data fusing unit operates in the WGS84 coordinate system and the other units operates in the offset GJC-02 coordinate system. Since the data fusing unit is the basis for the respective modules, with the data fusing unit being set to operate in the WGS84 coordinate system without offset, and the rest of the units being set to operate in the offset GJC-02 coordinate system, the impact of accumulated errors is eliminated while ensuring compliance with the regulations.

The method for processing map data provided by the embodiment of the present application includes: a controlling unit inputs initial positioning data collected by a data collecting unit to a data fusing unit to obtain fused positioning data, where the initial positioning data and the fused positioning data are data in a first coordinate system; the controlling unit performs offset processing on the fused positioning data to obtain offset positioning data; the controlling unit acquires image data and radar data collected by the data collecting unit; the controlling unit obtains a map in a second coordinate system through a map service unit; the controlling unit inputs the image data, the radar data, the map in the second coordinate system, and the offset positioning data to a positioning unit to obtain relative positioning data outputted by the positioning unit, where the positioning unit is configured for map matching processing; the controlling unit corrects the offset positioning data according to the relative positioning data through the positioning unit to obtain target positioning data; and the controlling unit performs a positioning operation on the target positioning data through at least one positioning unit, to determine a position of a vehicle corresponding to an autonomous driving system. With the controlling unit controlling respective units to perform positioning, during the positioning process, the data fusing unit calculates in the WGS48 coordinate system without offset. Since the fused positioning data obtained and processed by the data fusing unit is the basis for the other units, the generation and accumulation of errors is effectively avoided. The controlling unit then performs the offset processing on the fused positioning data, thereby effectively ensuring that the positioning process is finished in the offset coordinate system. In the embodiment, map matching processing is also performed on the offset positioning data to further improve the accuracy of positioning. As discussed above, the embodiments of the present application can effectively improve the accuracy of positioning on the basis of compliance with regulations.

As discussed above, in the technical solution of the present application, only the data fusing unit operates in the WGS84 coordinate system while the rest of algorithm units operate in the offset GJC-02 coordinate system. Since the data fusing unit is the basis for the respective units, therefore, with the data fusing unit operating in the WGS84 coordinate system without offset and the other units operating in the offset GJC-02 coordinate system, it is ensured that the error will not be accumulated and the accuracy of positioning is thus effectively improved.

Figure 6:
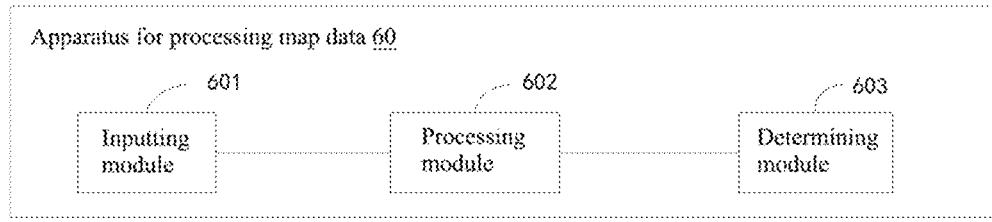
FIG. 6 is a schematic structural diagram of an apparatus for processing map data according to an embodiment of the present application.

FIG. 6 is a schematic structural diagram of an apparatus for processing map data according to an embodiment of the present application. As shown in FIG. 6, the apparatus for processing map data 600 of the embodiment may include: an inputting module 601, a processing module 602, and a determining module 603.

The inputting module 601 is for the controlling unit to input initial positioning data collected by the data collecting unit to the data fusing unit to obtain fused positioning data, where the initial positioning data and the fused positioning data are data in the first coordinate system.

The processing module 602 is for the controlling unit to obtain target positioning data according to the fused positioning data, where the target positioning data is data in the second coordinate system, and the second coordinate system is a coordinate system obtained by offsetting the first coordinate system.

The determination module 603 is for the controlling unit to perform a positioning operation on the target positioning data through the at least one positioning unit, to determine a position of a vehicle corresponding to the autonomous driving system.

In a possible implementation, the processing module 602 including:
  an offset processing submodule for the controlling unit to perform offset processing on the fused positioning data to obtain offset positioning data;
  a map matching submodule for the controlling unit to perform map matching according to the offset positioning data to obtain relative positioning data; and a target positioning data determining submodule for the controlling unit to obtain the target positioning data according to the offset positioning data and the relative positioning data.

In a possible implementation, the autonomous driving system further includes a map service unit;

the map matching submodule including:

an acquiring submodule for the controlling unit to acquire image data and radar data collected by the data collecting unit;

the acquiring submodule is further for the controlling unit to acquire a map in the second coordinate system through the map service unit;

a relative positioning data determination submodule for the controlling unit to perform the map matching according to the image data, the radar data, the map in the second coordinate system and the offset positioning data, to obtain the relative positioning data.

In a possible implementation, the relative positioning data determining submodule is specifically configured for:

the controlling unit to input the image data, the radar data, the map in the second coordinate system, and the offset positioning data to the positioning unit to obtain the relative positioning data outputted from the positioning unit, where the positioning unit is configured for map matching processing.

In a possible implementation the target positioning data determining submodule is specifically configured for:

the controlling unit to correct the offset positioning data according to the relative positioning data through the positioning unit to obtain the target positioning data.

In a possible implementation, the positioning unit includes at least one of the following: a lane-level positioning unit and a road-level positioning unit.

In a possible implementation, the first coordinate system is the World Geodetic System WGS48 coordinate system, and the second coordinate system is the GCJ-02 coordinate system of the National Administration of Surveying and Mapping.

The present application provides a method and an apparatus for processing map data applied to autonomous driving technologies in the field of data processing to achieve the purpose of improvement in the accuracy of positioning.

According to an embodiment of the present application, the present application also provides an electronic device and a readable storage medium.

According to an embodiment of the present application, the present application also provides a computer program product including: a computer program stored in a readable storage medium, and at least one processor of an electronic device can read the computer program from the readable storage medium, and the at least one processor executes the computer program to cause the electronic device to execute the solution provided in any of the foregoing embodiments.

Figure 7:
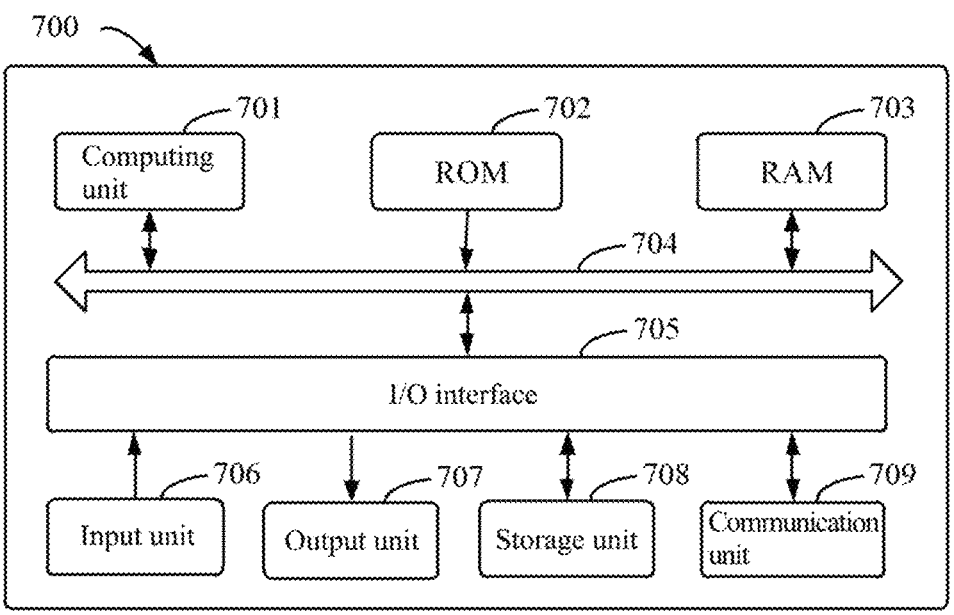
FIG. 7 is a block diagram of an electronic device for implementing the method for processing map data according to an embodiment of the present application.

FIG. 7 shows a schematic block diagram of an exemplary electronic device 700 which can be configured to implement embodiments of the present application. The electronic devices are intended to represent various forms of digital computers, such as laptop computers, desktop computers, workstations, personal digital assistants, servers, blade servers, mainframe computers, and other suitable computers. The electronic devices can also represent various forms of mobile apparatuses, such as personal digital processing, cellular phones, smart phones, wearable devices, and other similar computing apparatuses. The components, the connections and relationships and the function of the components shown herein are merely examples, and are not intended to limit the implementation of the present disclosure described and/or required herein.

As shown in FIG. 7, the electronic device 700 includes a computing unit 701, which can perform various appropriate actions and processing based on a computer program stored in a read only memory (ROM) 702 or a computer program loaded from a storage unit 708 to a random access memory (RAM) 703. Various programs and data required for the operation of the device 700 can also be stored in the RAM 703. The calculation unit 701, the ROM 702, and the RAM 703 are connected to each other through a bus 704. An input/output (I/O) interface 705 is also connected to the bus 704.

The multiple components in the device 700 are connected to the I/O interface 705, the said multiple components including: an input unit 706, such as a keyboard and a mouse; an output unit 707, such as various types of displays and speakers; and a storage unit 708, such as a disk and an optical disc; and communication unit 709, such as network adapter, modem and wireless communication transceiver. The communication unit 709 allows the device 700 to exchange information/data with other devices through a computer network such as the Internet and/or various telecommunication networks.

The computing unit 701 may be various general purpose processing components and/or dedicated processing components with processing and computing capabilities. Some examples of the computing unit 701 include but are not limited to a central processing unit (CPU), a graphics processing unit (GPU), various dedicated artificial intelligence (AI) computing chips, various computing units executing machine learning model algorithms, digital signal processing (DSP), and any appropriate processor, controller, microcontroller, etc. The calculation unit 701 performs the various methods and processing described above, such as a method for processing map data, for example. For example, in some embodiments, the method for processing map data may be implemented as a computer software program which is tangibly contained in a machine readable medium such as the storage unit 708. In some embodiments, part or all of the computer program may be loaded to and/or installed on the device 700 via the ROM 702 and/or the communication unit 709. When the computer program is loaded into the RAM 703 and executed by the calculation unit 701, one or more steps of the method for processing map data described above can be performed. Alternatively, in other embodiments, the calculation unit 701 may be configured to execute the method for processing map data in any other suitable manner (for example, by means of firmware).

Various implementations of the systems and technologies described in the present application can be implemented in digital electronic circuit systems, integrated circuit systems, field programmable gate arrays (FPGA), application specific integrated circuits (ASIC), application specific standard products (ASSP), system on chip systems (SOC), complex programmable logic devices (CPLD), computer hardware, firmware, software, and/or a combination thereof. The various implementations may include: being implemented in one or more computer programs, the one or more computer programs can be executed and/or interpreted in a programmable system including at least one programmable processor, the programmable processor can be a dedicated or general purpose programmable processor which can receive data and instructions from a storage system, at least one input apparatus and at least one output apparatus, and can transmit the data and instructions to the storage system, the at least one input apparatus, and the at least one output apparatus.

The program code for implementing the method of the present disclosure can be written in any combination of one or more programming languages. The program codes can be provided to a processors or controllers of a general purpose computer, an application specific computer, or other programmable data processing apparatus, so that the functions/operations specified in the flowcharts and/or the block diagrams are implemented when the program codes are executed by the processors or controllers. The program code may be executed on a machine entirely or partly, partly executed on the machine and partly executed on a remote machine as an independent software package, or executed on the remote machine or server entirely.

In the context of the present disclosure, a machine readable medium may be a tangible medium, which may contain or store a program for usage by the instruction execution system, apparatus, or device, or being used in combination with the instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage media would include electrical connections based on one or more wires, portable computer disks, hard disks, random access memories (RAM), read only memories (ROM), erasable programmable read only memories (EPROM or flash memory), optical fibers, portable compact disk read only memories (CD-ROM), optical storage devices, magnetic storage devices, or any suitable combination of the foregoing.

In order to provide interaction with the user, the system and technology described here can be implemented on a computer having: a display device for displaying information to a user (for example, CRT (cathode ray tube) or LCD (liquid crystal display) monitor); a keyboard and a pointing device (for example, a mouse or a trackball) through which the user can provide input to the computer. Other types of apparatus can also be used to provide interaction with the user; for example, the feedback provided to the user can be any form of sensory feedback (for example, visual feedback, auditory feedback, or tactile feedback); and the input from the user can be received in any form (including acoustic input, voice input, or tactile input).

The systems and technologies described here can be implemented in a computing system that includes back-end components (for example, as a data server), or a computing system that includes middleware components (for example, an application server), or a computing system that includes front-end components (for example, a user computer having a graphical user interface or a web browser through which the user can interact with the implementation of the system and technology described herein), or in a computing system which includes any combination of such back-end components, middleware components and the front-end components. The components of the system can be connected to each other through digital data communication of any form or medium (for example, a communication network). Examples of communication networks include: a local area network (LAN), a wide area network (WAN), and the Internet.

The computer systems may include a client and a server. The client and server are generally far away from each other and usually interact through a communication network. The relationship between the client and the server is generated by computer programs executing on the corresponding computers having a client-server relationship with each other. The server can be a cloud server, also known as a cloud computing server or a cloud host, and is a host product in the cloud computing service system to solve the problem of difficult management and weak business scalability in the traditional physical host and VPS service ("Virtual Private Server", or "VPS" for short). The server can also be a server of a distributed system, or a server combined with a blockchain.

It should be understood that the various forms of processes shown above can be used, reordered, to which steps can be added or deleted. For example, the steps described in the present application can be executed in parallel, sequentially, or in a different order, which is not limited herein, as long as the desired result of the technical solution disclosed in the present application can be achieved.

The above specific implementations do not constitute a limitation on the scope of protection of the present application. Those skilled in the art should understand that various modifications, combinations, sub-combinations and substitutions can be made according to the design requirements and other factors. Any modification, equivalent replacement and improvement made within the spirit and principle of the present application shall be included in the protection scope of the present application.

What is claimed is:

1. A method for processing map data applied to an autonomous driving system comprising a controlling unit, a data collecting unit, a data fusing unit, at least one positioning unit, and a map service unit, the method comprising:
   inputting, by the controlling unit, initial positioning data collected by the data collecting unit to the data fusing unit to obtain fused positioning data, wherein the initial positioning data is data collected by multiple sensors in the data collecting unit without offset processing, and the initial positioning data and the fused positioning data are data in a first coordinate system;
   performing, by the controlling unit, the offset processing on the fused positioning data to obtain offset positioning data, wherein the offset processing comprising encrypting data in the first coordinate system to data in a second coordinate system by means of a one-way mapping;
   acquiring, by the controlling unit, image data and radar data collected by the data collecting unit;
   acquiring, by the controlling unit, a map in the second coordinate system through the map service unit;
   inputting, by the controlling unit, the image data, the radar data, the map in the second coordinate system, and the offset positioning data to the at least one positioning unit to obtain the relative positioning data output by the at least one positioning unit, wherein the positioning unit is configured for map matching processing and comprises at least one of a lane-level positioning unit and a road-level positioning unit;
   correcting, by the controlling unit, the offset positioning data according to the relative positioning data to obtain target positioning data, wherein the target positioning data is data in the second coordinate system; and
   determining, by the controlling unit, a position of a vehicle corresponding to the autonomous driving system according to the target positioning data.

2. The method according to claim 1, wherein the first coordinate system is a World Geodetic System (WGS48)

coordinate system and the second coordinate system is a GCJ-02 coordinate system of a National Administration of Surveying and Mapping.

3. A non-transitory computer-readable storage medium storing computer instructions, wherein the computer instructions are configured to cause a computer to execute the method according to claim 1.

4. An apparatus for processing map data applied to an autonomous driving system comprising at least one processor, at least one sensor communicatively connected with the at least one processor, a memory communicatively connected with the at least one processor;
  the memory stores instructions executable by the at least one processor;
  wherein the at least one processor, when running the instructions stored in the memory, is enabled to:
  control an input interface to input initial positioning data collected by the at least one sensor to obtain fused positioning data, wherein the initial positioning data is data collected by multiple sensors in a data collecting unit without offset processing, and the initial positioning data and the fused positioning data are data in a first coordinate system;
  perform the offset processing on the fused positioning data to obtain offset positioning data, wherein the offset processing comprising encrypting data in the first coordinate system to data in a second coordinate system by means of a one-way mapping;
  acquire image data and radar data collected by the at least one sensor;
  acquire a map in the second coordinate system;
  control the input interface to input the image data, the radar data, the map in the second coordinate system, and the offset positioning data to the at least one processor to obtain the relative positioning data, wherein the at least one processor is configured for map matching processing;
  correct the offset positioning data according to the relative positioning data to obtain target positioning data, wherein the target positioning data is data in the second coordinate system; and
  determine a position of a vehicle corresponding to the autonomous driving system according to the target positioning data.

5. The apparatus according to claim 4, wherein the first coordinate system is a World Geodetic System (WGS48) coordinate system and the second coordinate system is a GCJ-02 coordinate system of a National Administration of Surveying and Mapping.

\* \* \* \* \*